United States Patent [19]

Bodine

[11] 3,747,687
[45] July 24, 1973

[54] SONIC HAND CULTIVATOR
[76] Inventor: Albert G. Bodine, 7877 Woodley Ave., Van Nuys, Calif. 91406
[22] Filed: June 24, 1967
[21] Appl. No.: 655,611

Related U.S. Application Data
[63] Continuation-in-part of Ser. No. 471,944, July 14, 1965, Pat. No. 3,376,798.

[52] U.S. Cl. .................. 172/40, 172/21, 172/350
[51] Int. Cl. ............................................. A01b 35/00
[58] Field of Search ................... 172/40, 350, 19, 172/97, 21; 173/49; 175/55; 299/14

[56] References Cited
UNITED STATES PATENTS
3,030,715  4/1962   Bodine ........................... 172/40 X
3,269,039  8/1966   Bodine ........................... 172/40 X
3,278,235  10/1966  Bergstrom ...................... 173/49 X
3,231,025  1/1966   Bodine ........................... 172/40
2,960,314  11/1960  Bodine ............................. 165/1
2,774,292  12/1956  Hartman .......................... 172/40
1,305,215  5/1919   Iodice ........................... 172/350
2,641,982  6/1953   Harshberger ..................... 172/40
2,897,902  8/1959   Emmons ........................... 172/40

FOREIGN PATENTS OR APPLICATIONS
1,022,404  1/1958   Germany .......................... 172/40
496,097    3/1930   Germany .......................... 172/42

Primary Examiner—Robert E. Pulfrey
Assistant Examiner—Clifford D. Crowder
Attorney—Sokolski & Wohlgemuth

[57] ABSTRACT

A sonic hand cultivator comprised of an orbiting-mass oscillator which in turn drives or vibrates a resonator coupled to a plurality of spikes or tines which are caused to resonantly vibrate as they embed themselves in the ground.

2 Claims, 7 Drawing Figures

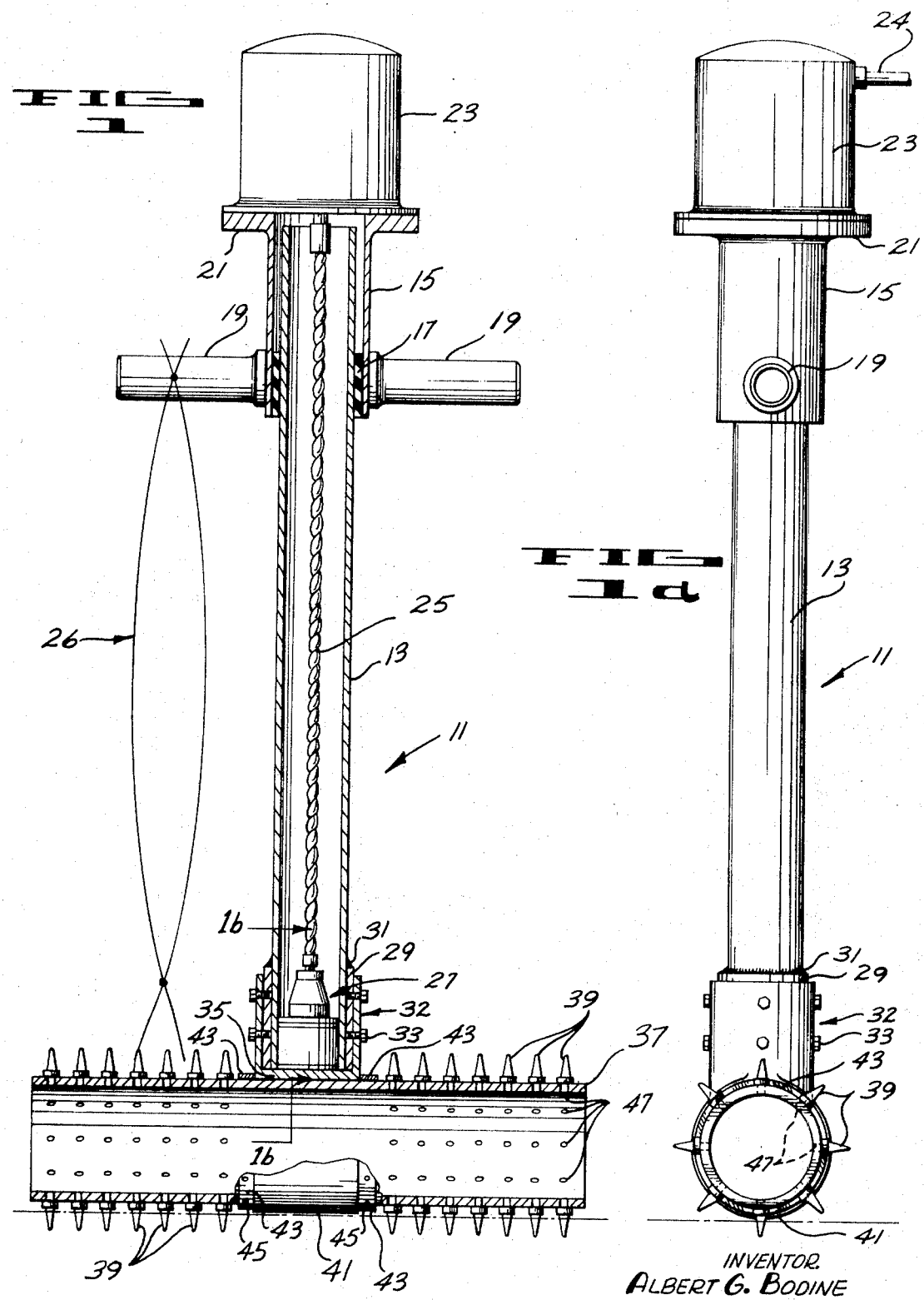

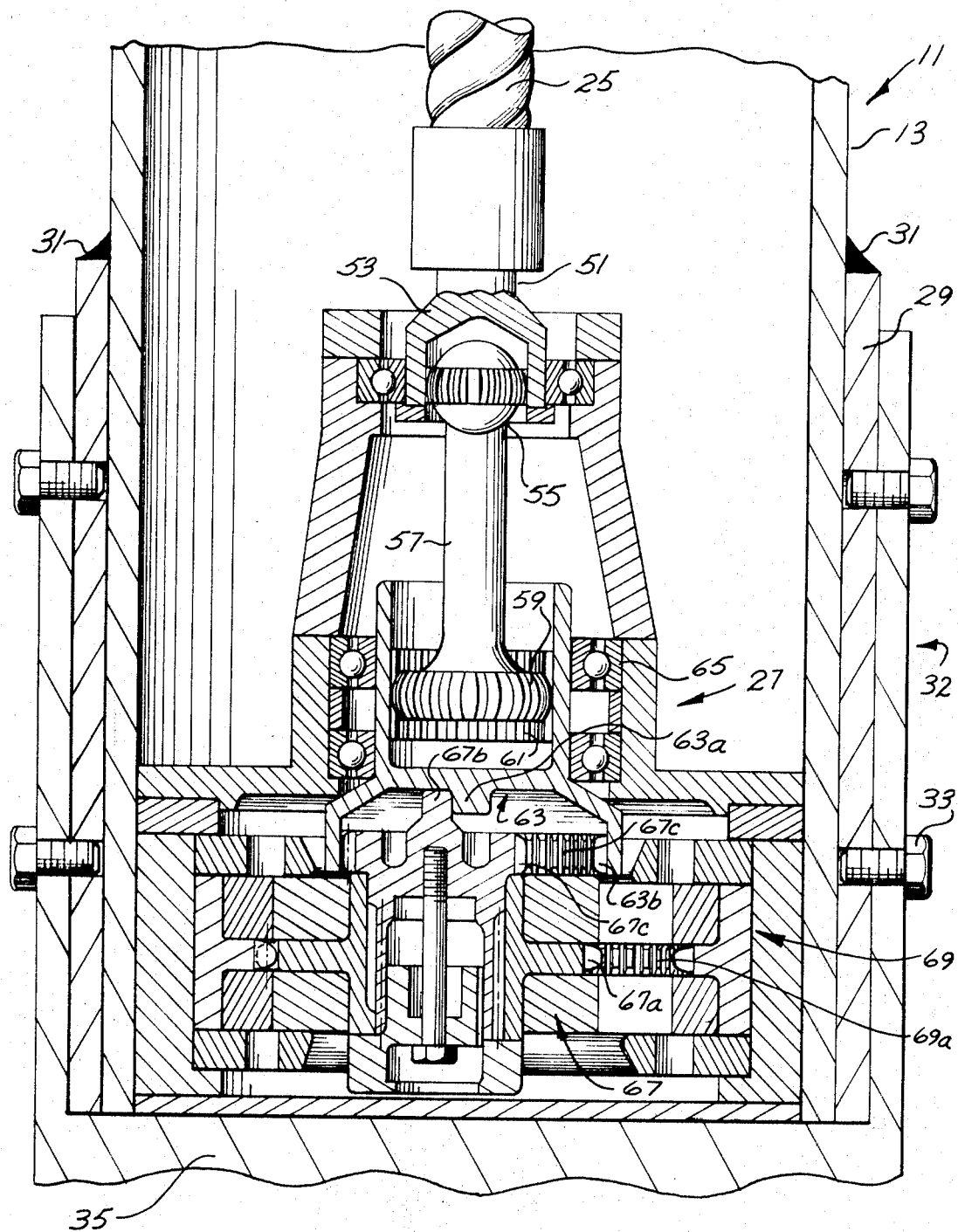

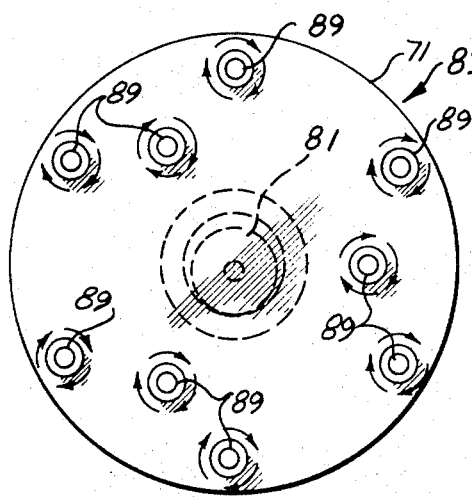
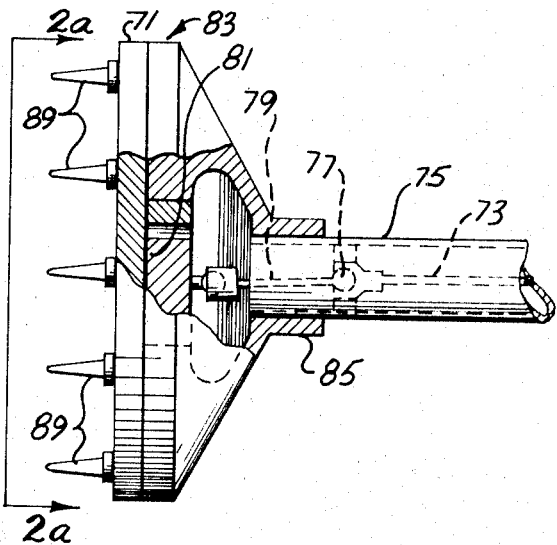
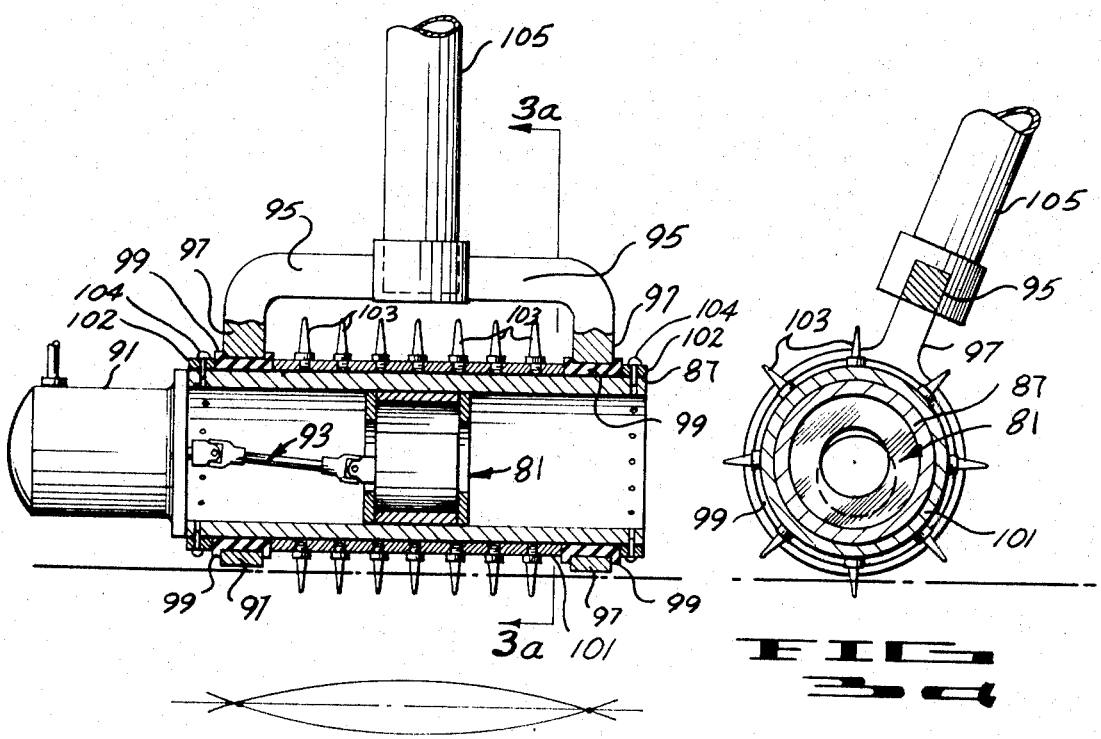
INVENTOR.
ALBERT G. BODINE
BY
Sokolski & Wohlgemuth
ATTORNEYS

SONIC HAND CULTIVATOR

This application is a continuation in part of my application Ser. No. 471,944, filed July 14, 1965, now U.S. Pat. No. 3,376,798.

As lawns mature the soil therein often becomes quite hard and compact. This hard soil effectively prevents growth of fresh new young roots. As a result, these older lawns will tend to develop dead spots where the new growth has been inhibited or prevented. In these dead spots the soil will become harder as the lawn dies out and the sun bakes the ground. In view of the foregoing process the ground becomes so hard that it is completely impossible for roots to re-establish themselves in this baked-out ground. Even water will no longer effectively penetrate it.

Prior to the herein invention, this long recognized problem was solved by various techniques involving the cultivation of the soil. One of the more difficult approaches was to cultivate the lawn with a shovel or spade. The most popular method of loosening the compacted soil was through the utilization of a device known as a rotary tiller. The rotary tiller, which is now a commonly well-known device, rotates a drum by means of a small gasoline engine. The rotating drum has a number of spears or tines extending therefrom which rip into the ground with extreme force and violence. The problem with the rotary tiller and most any other prior method of loosening the soil was that it so badly rips up the ground that the lawn is effectively destroyed. Regrading it is normally required. In effect, one must start with a new lawn. Perhaps the main problem with the rotary tiller is that it is quite difficult to use in a small area of the lawn where the compacted dried up situation exists, and that quite a large area is normally affected through its utilization whereby an entire new lawn is often necessitated over a wide area.

A further disadvantage of the rotaty tiller is its extreme violence of operation. Many incidents have arisen where the rotary tiller has caused damage to limbs of the operator due to the fact that the machine has run away or otherwise gone out of control.

The herein invention overcomes the deficiencies of the prior art devices in that it does not operate with great violence in the ground, yet effectively loosens the soil to even a greater degree than with a rotary tiller. Additionally the instant invention can be effectively used over quite small areas of the lawn without disturbing remaining portions which have not been baked out or become hard. Further, the herein invention is safe and easy to manipulate or operate. Potential damage to an individual or property is negligible since the device is not one of violent operation and actually could do little harm if it were to contact the person.

The herein invention which overcomes the deficiencies of the prior art device consists of a device for putting sonic energy into the ground. The ground is thus activated sufficiently to loam it and make it soft once again without completely ripping it apart so that it must be regraded. Additionally, the herein device will allow one to treat the given area to the extent desired. Unlike the use of rotary tillers, the herein device permits an individual to vary the degree of cultivation.

Briefly, the herein device comprises an orbiting-mass oscillator. The oscillator in turn drives a resonator which is essentially an elastic body capable of having established therein a standing wave pattern. The resonator is coupled to a series of spikes or tines which will vibrate in accord with the resonator. The spikes embed themselves in the ground as the machine operates. It can thus be seen that the device consists of three major components, namely the oscillator, the resonating element which is acoustically matched to the oscillator, and finally the spikes which serve as coupling means to couple the resonator to the ground. Preferably the spikes will extend some distance into the ground and serve to transmit the vibrations from the resonator into the acjacent soil. It is believed the invention will be better understood from the following detailed description and drawings in which:

FIG. 1 is a partially sectioned side elevation view of a preferred embodiment of the device of the invention;

FIG. 1a is a side view taken along lines 1a—1a of FIG. 1;

FIG. 1b is a sectional view of an oscllator taken along line 1b—1b of FIG. 1;

FIG. 2 is a partially sectional view of the operating portion of a second preferred embodiment of the invention;

FIG. 2a is a bottom view of the device of FIG. 2 taken along lines 2a—2a; 1

FIG. 3 is a partially 2 sectioned elevational view of a third preferred embodiment of the invention; and FIG. 3a is a side view taken along lines 3a—3a of FIG. 3.

It has been found most helpful in analyzing the operation of the device of this invention to analogize the acoustically vibrating circuit involved to an equivalent electrical circuit. This sort of approach to analysis is well known to those skilled in the art and is described, for example, in Chapter 2 of "Sonics," by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R, and mechanical impedance $Z_m$ is equated with electrical impedance $Z_e$.

Thus, it can be shown that if a member is elastically vibrated by means of an acoustical sinusoidal force $F_o \sin\omega t$, ($\omega$ being equal to $2\pi$ times the frequency of vibration), that $$Z_m = R_m + j(\omega M - (1/\omega C_m)) = F_o \sin\omega t / u \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is most efficiently delivered to a load to which the resonant system may be coupled.

It is to be noted that in the device of this invention the mass and compliance for forming the resonantly vibrating system are furnished by the structural members of such system themselves such that the earthen formation is not incorporated as a reactance in such system. The earth under such conditions acts as a resistive impedance load which provides no significant reactive components. This employment of apparatus resonance results in a random vibration of the earthen particles rather than a lumped coherent vibration such as results from nonresonant vibrating apparatus, with a considerable relative motion occurring between the separate grains. It is believed that each of the individual irregular grains when energized by the sonic energy in this sonic resonant fashion separately vibrates in a random path with a relatively fixed radius of vibration which changes in direction but remains fixed in magnitude. Such random vibration effectively separates the particles so that they do not adhere to each other. The net result is a uniquely high degree of fluidization of the earthen structure.

It is also important to note the significance of the attainment of high acoustical "Q" in the resonant system being driven, to increase the efficiency of the vibration thereof and to provide a maximum amount of energy for the cultivating operation. As for an equivalent electrical circuit, the "Q" of an acoustically vibrating circuit is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating circuit can be maximized to make for highly efficient, high-amplitude vibration by minimizing the effect of friction in the circuit and/or maximizing the effect of mass in such circuit.

In considering the significance of the parameters described in connection with equation (1), it should be kept in mind that the total effective resistance, mass, and compliance in the acoustically vibrating circuit are represented in the equation and that these parameters may be distributed throughout the system rather than being lumped in any one component or portion thereof.

It is also to be noted that an orbiting-mass oscillator may be utilized in the device of the invention that automatically adjusts its output frequency to maintain resonance with changes in the characteristics of the load. Thus, in the face of changes in the effective mass and compliance presented by the load, the system automatically is maintained in optimum resonant operation by virtue of the "lock-in" characteristics of the unique orbiting-mass oscillator. The vibrational output from such an orbiting-mass oscillator is generated along a controlled predetermined coherent path to provide maximum output along a desired axis or axes. The orbiting-mass oscillator automatically changes not only its frequency but its phase angle and therefore its power factor with changes in the impedance load to assure optimum efficiency of operation at all times.

The cultivating effect of the device of this invention results from the high-energy sonic action which generates, as indicated above, a fluidizing-type condition in the soil. The fluidization is accomplished to such a degree since the soil is not required to present any reactance. For example, in a bodily vibration device such as a simple oscillator connected to a cultivator, the soil will present a capacitive response in order to meet the inertia mass of the vibrating cultivator. This limits the conventional-type vibrator's utilization since the soil grains will then vibrate in unison since they are attempting to present a single capacitive reactance in order to counteract the mass reactance of the tool. In the instant resonant sonic device, the elastic resonator member counteracts the inertia of the tool all within itself and therefore the soil presents only resistive impedance as indicated. In view of this action, a maximum fluidization will occur.

Turning now to FIGS. 1 and 1a, there is seen one preferred embodiment of a cultivator device 11 of the invention. An elongated cylindrical tube 13 comprises the main resonant body of the device. The upper end of the tube 13 is surrounded by a flanged fitting 15 and is acoustically isolated from the tube by acoustic isolators 17 which can be of rubber or like elastic material. Two handles 19 extend oppositely from the fitting 15 adjacent its bottom end so that the operator can easily grasp and control the device. On the flange portion 21 of the fitting 15 is affixed a motor 23 which serves to operate the system. Thus it can be seen that the motor 23 is additionally effectively acoustically isolated from shaft 13. This prevents dissipation of the vibratory energy into the motor. The motor 23 can be electrically driven by current directed through line 24 or can be gasoline operated if so desired, so as to be completely portable.

Extending downwardly from the motor 23 within the shaft or tube 13 is a cable or solid axle 25, extending between the motor and an orbiting-mass oscillator 27 disposed within the tube 13 at its bottommost portion. A bushing 29 surrounds the bottom portion of the tube 13 and is welded thereto at 31. Bushing 29 serves to increase the effective wall thickness at this portion so that a fitting 32 can be secured thereto by bolts 33. The bottom portion 35 of fitting 32 surrounds a cylinder 37 having a plurality of spikes 39 extending therefrom. Where fitting 32 joins cylinder 37 there is formed a slip bearing 41 so that the cylinder 37 is free to rotate relative to fitting 32. The fitting is held relative to the cylinder by two bands 43 on either side of the fitting surrounding the cylinder and affixed thereto by rivet 45. Each spike 39 which extends radially from cylinder 37 can be threadedly secured in apertures 47 in the cylinder or can be actually welded to the cylinder.

A standing wave pattern 26 is established in tube 13. The handles 19 are preferably located at nodes where minimum vibration occurs so as to minimize transfer thereto.

Referring now to FIG. 1b, an orbiting-mass oscillator unit which may be utilized in the device of the invention is illustrated. The output gear of cable 25 rotatably drives shaft 51. Shaft 51 has a socket 53 at the end thereof, which is splined and forms a ball and socket joint with splined ball member 55. Ball member 55 is fixedly attached to shaft 57 which has a crown gear 59 attached to the end thereof. Gear 59 forms a spline joint with splined annular portion 61 of rotor drive member 63. Rotor drive member 63 is rotatably mounted on ball bearings 65. The splined joints between ball member 55 and socket member 53 and crown gear 59 and splined portion 61 furnish play in the drive system which avoids undue strain on such system with the operation of the oscillator.

The rotor member 67 has a spur gear 67a attached thereto which rides around in a mating ring gear 69a coincident with the race in the oscillator housing 69. The rotor has a pin member which rides around a pin member 63a protruding from rotor drive member 63 as the rotor is driven by virtue of the engagement of rotor drive gear 67c with rotor drive member gear 63b. Rotor member 67 thus rides around the race formed in its housing.

Turning now to FIGS. 2 and 2a, there is seen an embodiment of the invention wherein the spikes or tines 89 are placed on the bottom of a flat plate 71. As shown, a drive cable 73 is directed through the center of outer elastic hollow shaft 75. Universal joint 77 serves to engage axle 79 connected to orbiting-mass oscillator 81, in a construction similar to that shown in FIG. 1b. A housing 83 surrounds the flat plate 71 and encloses the oscillator 81 gripping the shaft 75 with a sleeve 85. The oscillator 81 may have the same construction as shown in FIG. 1a.

The oscillator rotation is shown in FIG. 2a. This motion causes each of the tines 89 to vibrate in a circulatory motion as shown by the arrows. This particular embodiment is convenient in that it places all of the tines in engagement with the ground at one time. As a result, one obtains maximum surface contact. This arrangement is particularly suitable for soils of medium hardness where maximum performance is desired so the tool can work over substantial areas with a rapid application of the tool as it is moved about.

Turning to FIGS. 3 and 3a, there is shown a form of the tool where the tines are again mounted on a cylindrical member similar to FIG. 1. However, in this case the oscillator 81 is such that the tines describe a gyratory motion about a horizontal axis. As shown, an inner cylinder 87 surrounds the oscillator 81. Attached to one end of the cylinder is a drive motor 91 which serves to drive the oscillator 81 through a universal joint and axle combination 93. A yoke 95 has arms 97 which are attached to the cylinder 87 and are separated therefrom by acoustic isolators 99 of rubber or similar material which will absorb the vibrations in the cylinder. Between the arms 97 surrounding the cylinder is a sleeve 101 to which are fixed the tines 103. The sleeve 101 is rotatable on the cylinder 87. Surrounding the isolators 99 at both extremities of the cylinder 87 are two bands 102 secured by rivets 104 to the cylinder 87. The bands serve to hold in place the yoke 95 relative to the cylinder. Additionally, the yoke can itself be riveted through the acoustic isolators to the cylinder if desired. As can be seen, when a handle 105 attached to the yoke 95 is moved the splines on their bearing sleeve 101 can move relative thereto across the ground. The movement of the oscillator is in effect similar to an acoustic paving action which results in an especially high degree of fluidization for soils having high cohesive or tensile strength. The oscillator 81 can be of the type previously described or can be similar to that shown in issued U.S. Pat. No. 2,960,314 of the same inventor, issued Nov. 15, 1960.

The oscillators used in the instant invention have been shown by way example only herein, and any suitable acoustic resonant oscillator is suitable. Several types of these are shown in the aforementioned U.S. Pat. No. 2,960,314.

I claim:

1. A soil cultivation device comprising:
an orbiting mass oscillator;
a body comprising a hollow cylinder capable of resonant vibration coupled to said oscillator and an elongated elastic hollow tube attached to said cylinder;
means for driving said oscillator at a frequency such as to cause resonant vibration of said body;
said oscillator being adapted to automatically adjust its output frequency to maintain resonant vibration with changes in the effective impedance presented by said body;
a plurality of soil engaging members emanating radially from said cylinder for penetrating into the soil to cause the grains of the soil to vibrate in a random fashion as an acoustical resistive load;
the longitudinal axis of said cylinder being oriented normally to the longitudinal axis of said hollow tube and disposed parallel to the soil when the soil engaging members are penetrating therein, and
means for providing rotation of said cylinder relative to said hollow tube,
said oscillator being disposed within said hollow tube adjacent to the interface of the tube with the cylinder whereby a standing wave vibrational pattern is established in the cylinder.

2. The device of claim 1 wherein said oscillator describes an orbit parallel to the center axis of said cylinder.

* * * * *